(12) United States Patent
Alpert (10) Patent No.: US 11,157,166 B2
(45) Date of Patent: Oct. 26, 2021

(54) AUTOMOVE SMART TRANSCRIPTION

(71) Applicant: Tomer Alpert, Telluride, CO (US)

(72) Inventor: Tomer Alpert, Telluride, CO (US)

(73) Assignee: Felt, Inc., Telluride, CO (US)

(*) Notice: Subject to any disclaimer, the term of this patent is extended or adjusted under 35 U.S.C. 154(b) by 128 days.

(21) Appl. No.: 15/357,862

(22) Filed: Nov. 21, 2016

(65) Prior Publication Data
US 2017/0147195 A1    May 25, 2017

Related U.S. Application Data

(60) Provisional application No. 62/258,180, filed on Nov. 20, 2015.

(51) Int. Cl.
*G06F 3/0488* (2013.01)
*G06F 3/0485* (2013.01)
*G06F 3/01* (2006.01)

(52) U.S. Cl.
CPC .......... *G06F 3/04883* (2013.01); *G06F 3/013* (2013.01); *G06F 3/015* (2013.01); *G06F 3/0485* (2013.01); *G06F 2203/0381* (2013.01)

(58) Field of Classification Search
CPC .... G06F 3/04883; G06F 3/0485; G06F 3/013; G06F 3/015; G06F 2203/0381
See application file for complete search history.

(56) References Cited

U.S. PATENT DOCUMENTS

| | | | | |
|---|---|---|---|---|
| 4,727,588 A * | 2/1988 | Fox | ......................... | G06K 9/222 345/173 |
| 5,528,743 A * | 6/1996 | Tou | ......................... | G06F 17/25 345/179 |
| 5,559,942 A * | 9/1996 | Gough | .................. | G06F 3/0481 715/802 |
| 5,710,832 A * | 1/1998 | Berman | ................. | G06K 9/033 382/187 |
| 6,054,990 A * | 4/2000 | Tran | ...................... | G06F 3/0481 345/179 |
| 6,256,009 B1 * | 7/2001 | Lui | ........................ | G06F 3/0485 178/18.03 |
| 6,415,256 B1 * | 7/2002 | Ditzik | .................... | G06F 3/0488 345/169 |
| 6,499,043 B1 * | 12/2002 | Forcier | ................. | G06F 40/166 715/273 |
| 6,502,114 B1 * | 12/2002 | Forcier | ................. | G06F 3/0488 715/273 |
| 6,552,719 B2 * | 4/2003 | Lui | ..................... | G06F 3/04883 345/168 |
| 6,816,615 B2 * | 11/2004 | Lui | ..................... | G06F 3/03545 382/175 |
| 7,106,312 B2 * | 9/2006 | Pennington, II | .... | G06F 3/04883 345/157 |
| 7,203,903 B1 * | 4/2007 | Thompson | .......... | G06F 3/04883 382/187 |

(Continued)

*Primary Examiner* — Yongjia Pan
(74) *Attorney, Agent, or Firm* — Staniford Tomita LLP (57) ABSTRACT

In one embodiment, the instant application provides one or more of receiving a mobile device's analysis of a movement of a finger, determining a word from the analyzed finger movement, determining a part of a message based on the determined word, placing the word in the message, and based on the analysis, providing space for a new word to be written by the finger.

19 Claims, 9 Drawing Sheets

(56) References Cited

U.S. PATENT DOCUMENTS

| | | | | |
|---|---|---|---|---|
| 7,266,769 | B2* | 9/2007 | Thacker | G06F 3/0481 707/999.104 |
| 7,283,126 | B2* | 10/2007 | Leung | G06F 3/04883 345/173 |
| 7,322,008 | B2* | 1/2008 | Thacker | G06F 3/0481 382/186 |
| 7,392,475 | B1* | 6/2008 | Leban | G06F 17/241 715/255 |
| 7,478,143 | B1* | 1/2009 | Friedman | G06Q 30/02 709/203 |
| 7,650,568 | B2* | 1/2010 | Williamson | G06F 17/242 715/255 |
| 7,735,007 | B2* | 6/2010 | Altman | G06F 17/211 715/244 |
| 7,894,836 | B1* | 2/2011 | Fuoss | H04W 4/12 345/173 |
| 7,912,700 | B2* | 3/2011 | Bower | G06F 3/0237 704/1 |
| 8,116,569 | B2* | 2/2012 | Markiewicz | G06F 3/0237 345/179 |
| 8,610,671 | B2* | 12/2013 | Westerman | G06F 3/0485 345/157 |
| 8,612,513 | B2* | 12/2013 | Friedman | G06Q 20/105 709/203 |
| 8,824,785 | B2* | 9/2014 | Ives | G06K 9/00442 382/164 |
| 9,116,871 | B2* | 8/2015 | Isabel | G06F 17/241 |
| 9,304,682 | B2* | 4/2016 | Hoyer | G06F 3/04886 |
| 9,317,935 | B2* | 4/2016 | Kwon | G06F 3/04883 |
| 9,423,908 | B2* | 8/2016 | Zhang | G06F 3/04883 |
| 9,454,694 | B2* | 9/2016 | Novak | G06T 11/60 |
| 9,678,659 | B2* | 6/2017 | Stallings | G06F 3/04883 |
| 9,965,175 | B2* | 5/2018 | Rucine | G06K 9/00402 |
| 10,057,205 | B2* | 8/2018 | Spicer | H04L 51/32 |
| 2002/0057836 | A1* | 5/2002 | Lui | G06F 3/03545 382/181 |
| 2002/0069220 | A1* | 6/2002 | Tran | G06F 3/04883 715/209 |
| 2003/0107607 | A1* | 6/2003 | Nguyen | G06F 3/04883 715/863 |
| 2003/0185444 | A1* | 10/2003 | Honda | G06F 3/04883 382/186 |
| 2003/0216913 | A1* | 11/2003 | Keely | G06K 9/222 704/235 |
| 2004/0054701 | A1* | 3/2004 | Garst | G06F 3/04883 708/131 |
| 2004/0070573 | A1* | 4/2004 | Graham | G06F 3/04883 345/179 |
| 2004/0177114 | A1* | 9/2004 | Friedman | G06Q 30/0239 709/203 |
| 2005/0177783 | A1* | 8/2005 | Agrawala | G06F 3/04883 715/230 |
| 2006/0090127 | A1* | 4/2006 | Silverbrook | B41J 2/17513 715/230 |
| 2007/0005670 | A1* | 1/2007 | Pennington, II | G06F 3/04883 708/160 |
| 2008/0119235 | A1* | 5/2008 | Nielsen | G06F 3/04883 455/566 |
| 2008/0170789 | A1* | 7/2008 | Thacker | G06F 3/0481 382/186 |
| 2008/0208745 | A1* | 8/2008 | Friedman | G06Q 30/0239 705/41 |
| 2012/0121181 | A1* | 5/2012 | Markiewicz | G06F 3/0237 382/186 |
| 2012/0212423 | A1* | 8/2012 | Dondurur | G06F 3/04883 345/173 |
| 2013/0042509 | A1* | 2/2013 | Hawkins | G06Q 30/06 40/124.01 |
| 2013/0145304 | A1* | 6/2013 | DeLuca | G06F 3/013 715/781 |
| 2013/0275133 | A1* | 10/2013 | Wang | G10L 15/265 704/235 |
| 2014/0201624 | A1* | 7/2014 | Clark | G06F 40/186 715/243 |
| 2014/0344662 | A1* | 11/2014 | Isabel | G06F 17/241 715/230 |
| 2014/0365878 | A1* | 12/2014 | Dai | G06F 3/04883 715/256 |
| 2015/0039709 | A1* | 2/2015 | Jacobs | H04L 51/10 709/206 |
| 2015/0067489 | A1* | 3/2015 | Zotto | G06F 3/04883 715/268 |
| 2015/0154676 | A1* | 6/2015 | Matousek | G06Q 30/0635 705/26.5 |
| 2015/0206005 | A1* | 7/2015 | Jung | G06K 9/00402 382/189 |
| 2016/0275584 | A1* | 9/2016 | Gibson | G06Q 30/0621 |
| 2017/0060819 | A1* | 3/2017 | Rucine | G06K 9/00402 |
| 2017/0060821 | A1* | 3/2017 | Rucine | G06F 40/106 |
| 2017/0118147 | A1* | 4/2017 | Dold | H04L 51/10 |
| 2018/0247357 | A1* | 8/2018 | Gaskin | G06F 3/04845 |

* cited by examiner

AUTOMOVE SMART TRANSCRIPTION

CROSS-REFERENCE

This disclosure is related to, and claims priority from U.S. Provisional Patent Application Ser. No. 62/258,180, filed on Nov. 20, 2015, entitled "AUTOMOVE SMART TRANSCRIPTION", the subject matter of this earlier filed application is hereby incorporated by reference in its entirety.

FIELD

This disclosure relates to the field of transcription, and more specifically, to smart transcription which places parts of a message in its proper place.

BACKGROUND

Currently, transcribing involves the manual placement of the various parts of a message, a means is sought to simplify this task by analyzing the word and placing the text for the user.

SUMMARY

In one embodiment, a method comprises one or more of receiving a mobile device's analysis of a movement of a finger, determining a word from the analyzed finger movement, determining a part of a message based on the determined word, placing the word in the message, and based on the analysis, providing space for a new word to be written by the finger.

In another embodiment, a system comprises a processor and memory, wherein the processor and memory are communicably coupled to one another, wherein the processor is configured to perform one or more of receive a mobile device's analysis of a movement of a finger, determine a word from the analyzed finger movement, determine a part of a message based on the determined word, place the word in the message and based on the analysis, provide space for a new word to be written by the finger.

In a further embodiment, a non-transitory computer readable storage medium configured to store instructions that when executed causes a processor to perform one or more of receive a mobile device's analysis of a movement of a finger, determine a word from the analyzed finger movement, determine a part of a message based on the determined word, place the word in the message and based on the analysis, provide space for a new word to be written by the finger.

DETAILED DESCRIPTION

It will be readily understood that the components of the present disclosure, as generally described and illustrated in the figures herein, may be arranged and designed in a wide variety of different configurations. Thus, the following detailed description of the examples of a method, apparatus, and system, as represented in the attached figures, is not intended to limit the scope of the disclosure as claimed, but is merely representative of selected examples of the disclosure.

The features, structures, or characteristics of the disclosure described throughout this specification may be combined in any suitable manner in one or more examples. For example, the usage of the phrases "examples", "some examples", or other similar language, throughout this specification refers to the fact that a particular feature, structure, or characteristic described in connection with the example may be included in at least one example of the present disclosure. Thus, appearances of the phrases "examples", "in some examples", "in other examples", or other similar language, throughout this specification do not necessarily refer to the same group of examples, and the described features, structures, or characteristics may be combined in any suitable manner in one or more examples.

Automove automatically allows the user to move to where they want to hand-write. Users want their handwriting to look very nice. When writing with your finger or a stylus a user might need the total writing surface to extend beyond the physical bounds of the user's computing device. In these instances the user would greatly benefit from a feature that would automatically move them to the end of the last word or drawing they made. Automove may be used on any surface that may be written upon such as an envelope, a card, a photo, a coloring book, and the like. Automove does not rely on any specific surface condition or material to be functional.

The Automove could jump to the end of a word or any other place on the paper the user would want. The Automove could also predict where the user wants it to be placed.

Automove could show movement or could just make the writing area appear in the new position. Automove could be used with handwriting, typing, data selection, data input or other user inputs.

In order to send a card a user knows certain information about the recipient. This information is needed for the recipient receiving the card. The recipient doesn't want this information being available though. However, it's information that our system needs to know. For example this information could be a mailing address which is needed for our system to be able to mail the card but the recipient doesn't want it to be publicly known. So the user can look up the recipient using public info like name, email, etc. Then the user submits the order and our system prints the address on the envelope. The recipient just has to be in our database.

The address book could be used to send cards via mail, email, text message, posting online on websites or other physical or electronic delivery including courier. The address book could be used to track and display the number of cards a user has received, is going to receive, wants to receive, etc.

The address book could be used to display dates like birthdays, anniversaries or other dates. It could display the user's information and information for other people associated with the user like their children. Matching local artists with local fans is currently difficult to achieve due to the lack of technology to properly classify local artists and search nearby events within a prescribed location.

The address book could allow for connections between users which users would need to request, approve or deny.

The address book could allow a user to create profiles for anyone they wish, not just themselves. It could then send these users some form of communication for them approve or it could automatically create their profiles.

Some users enter their info in to the database. Public info and private info. Public info like name, email, phone, public social handles and private info like their mailing address and their birthday.

Some other users look people up by their public or private info. Based on the user's setting they will see certain user info data. The user has the ability to keep data like an address private so that those looking them up may get their name or other public information, but not their mailing address.

The system has access to the user's inputted data. This allows the user to designate what information is public and what information is private. For example, you may make your name, employer and city public and keep your mailing address private. The system would print the mailing address on the envelope after an order is placed to that the sender of the card may not see your address, but it is printed on the envelope by the system.

Figure 1:
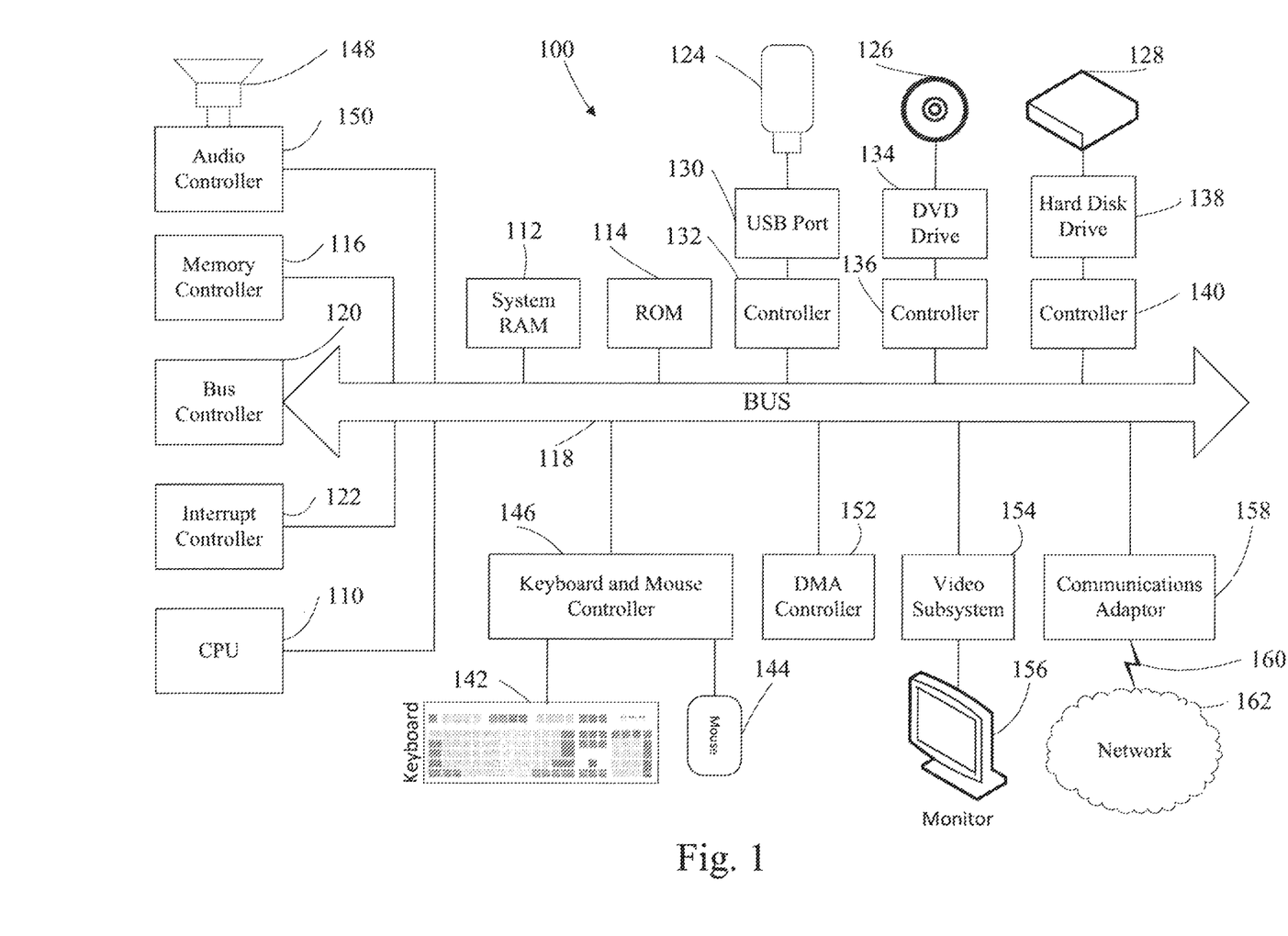
FIG. 1 illustrates a block diagram showing a computer system suitable for practicing an embodiment of the disclosure.

Computer System FIG. 1 illustrates the system architecture for an exemplary computer system 100 with which the current disclosure may be implemented. The exemplary computer system of FIG. 1 is for descriptive purposes only. Although the description may refer to terms commonly used in describing particular computer systems, such as a personal computer, the description and concepts equally apply to other systems, including systems having architectures dissimilar to FIG. 1.

Computer system 100 typically includes a central processing unit (CPU) 110, which may be implemented with one or more microprocessors, a random access memory (RAM) 112 for temporary storage of information, and a read only memory (ROM) 114 for permanent storage of information. A memory controller 116 is provided for controlling RAM. A bus 118 interconnects the components of the computer system. A bus controller 120 is provided for controlling the bus. An interrupt controller 122 is used for receiving and processing various interrupt signals from the system components. Mass storage may be provided by flash 124, DVD 126, or hard disk 128, for example a solid-state drive. Data and software may be exchanged with the computer system via removable media such as the flash drive and DVD. The flash drive is insertable into a Universal Serial Bus, USB, drive 130, which is, in turn, connected to the bus by a controller 132. Similarly, the DVD is insertable into DVD drive 134, which is, in turn, connected to bus by controller 136. Hard disk is part of a fixed disk drive 138, which is connected to the bus by controller 140.

User input to the computer system may be provided by a number of devices. For example, a keyboard 142 and a mouse 144 are connected to the bus by a controller 146. An audio transducer 148, which may act as a microphone and a speaker, is connected to bus by audio controller 150, as illustrated. Other input devices, such as a pen and/or tabloid, may be connected to the bus and an appropriate controller and software. DMA controller 152 is provided for performing direct memory access to the system RAM.

A visual display is generated by video subsystem 154, which controls video display 156. The computer system also includes a communications adaptor 158, which allows the system to be interconnected to a local area network (LAN) or a wide area network (WAN) or other suitable network, schematically illustrated by a bus 160 and a network 162.

Operation of the computer system is generally controlled and coordinated by an operating system, such as the Linux. The operating system controls allocation of system resources and performs tasks such as processing scheduling, memory management, networking, and I/O services, among other things.

Figure 2:
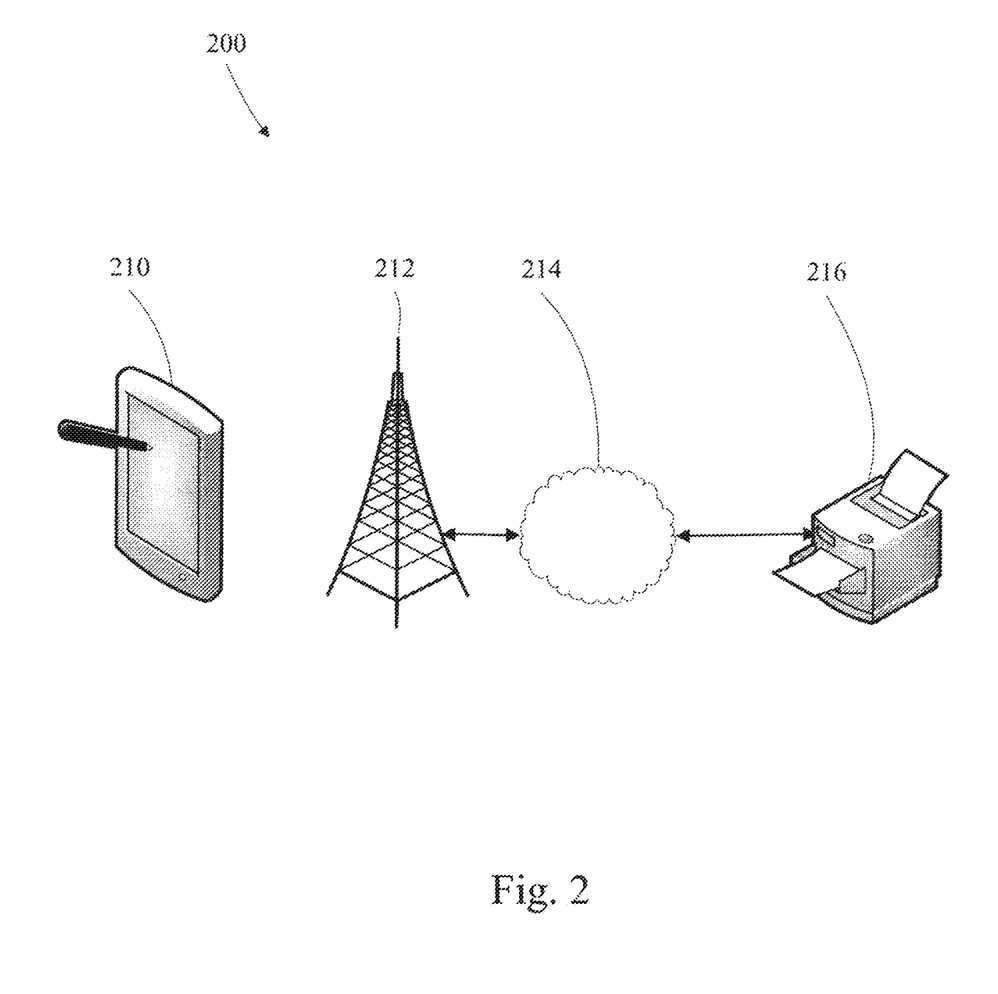
FIG. 2 illustrates a block diagram showing a tablet based system suitable for practicing an embodiment of the disclosure.

Computer System FIG. 2 illustrates the system 200 in which the user device 210 is connected to a network 212 which in turn is connected to the cloud 214 and at least one printer for printing out a message. The computer may request data from the cloud or server via the network. The data may be present in local memory, the cloud or the server. Results provided to the user through the mobile device may be provided via the network from the cloud or the server. The processor in the local user's computer, the cloud or the server may use the logic and algorithm to provide the results.

Figure 3:
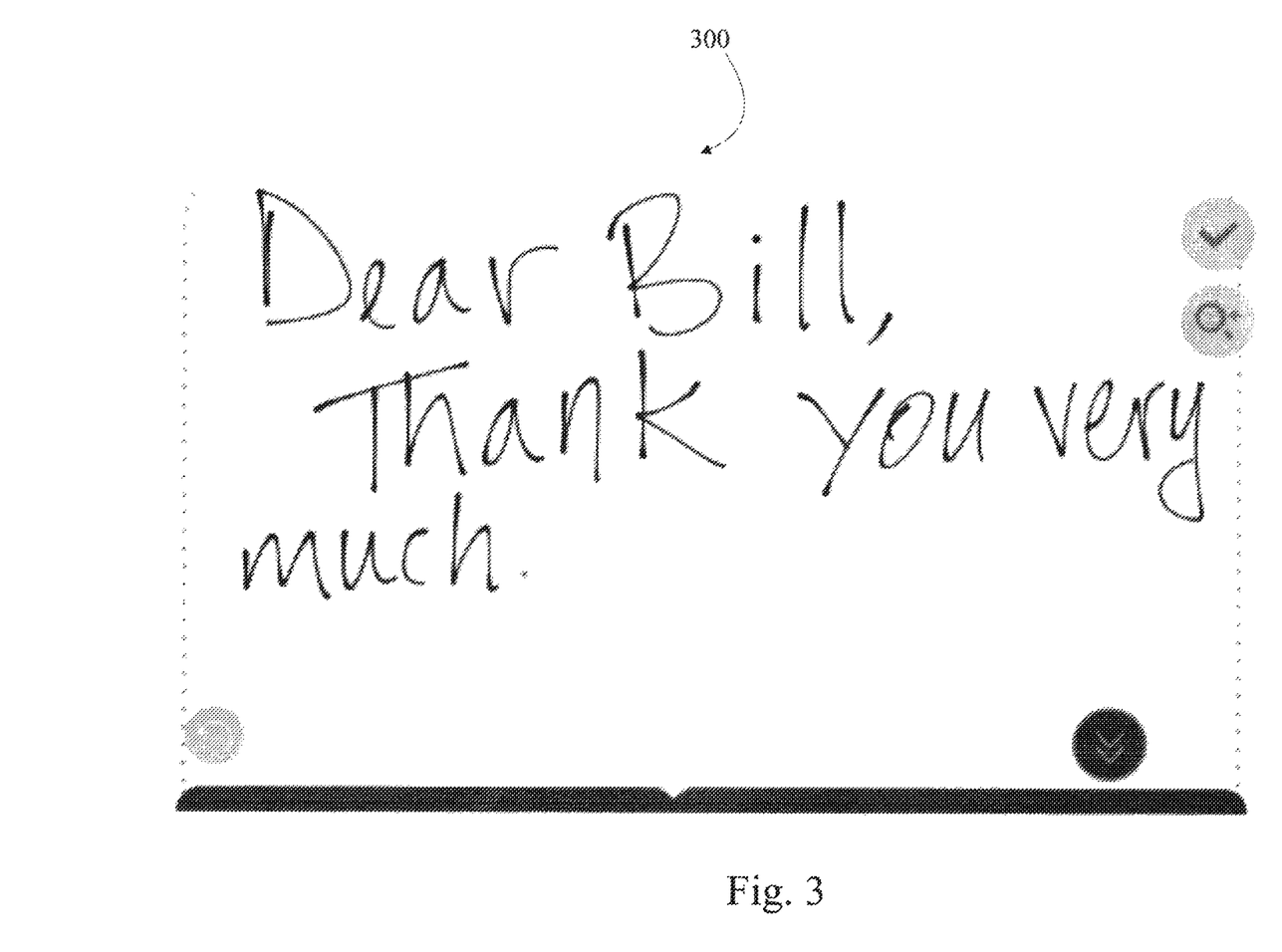
FIG. 3 illustrates an example transcribed message.

FIG. 3 illustrates an example message 300 viewable on a mobile device display screen. The various parts of the message such as the salutation are automatically placed by the system as the driver moves his finger.

In the examples which follow a mobile device's operating system analyzes the movement of the finger on the screen, this analysis is read by the system and then the users movements, handwriting, is drawn.

The system identifies the last spot they wrote, then when they request auto move to move the paper it can be moved to the last edge of the word.

Figure 4:
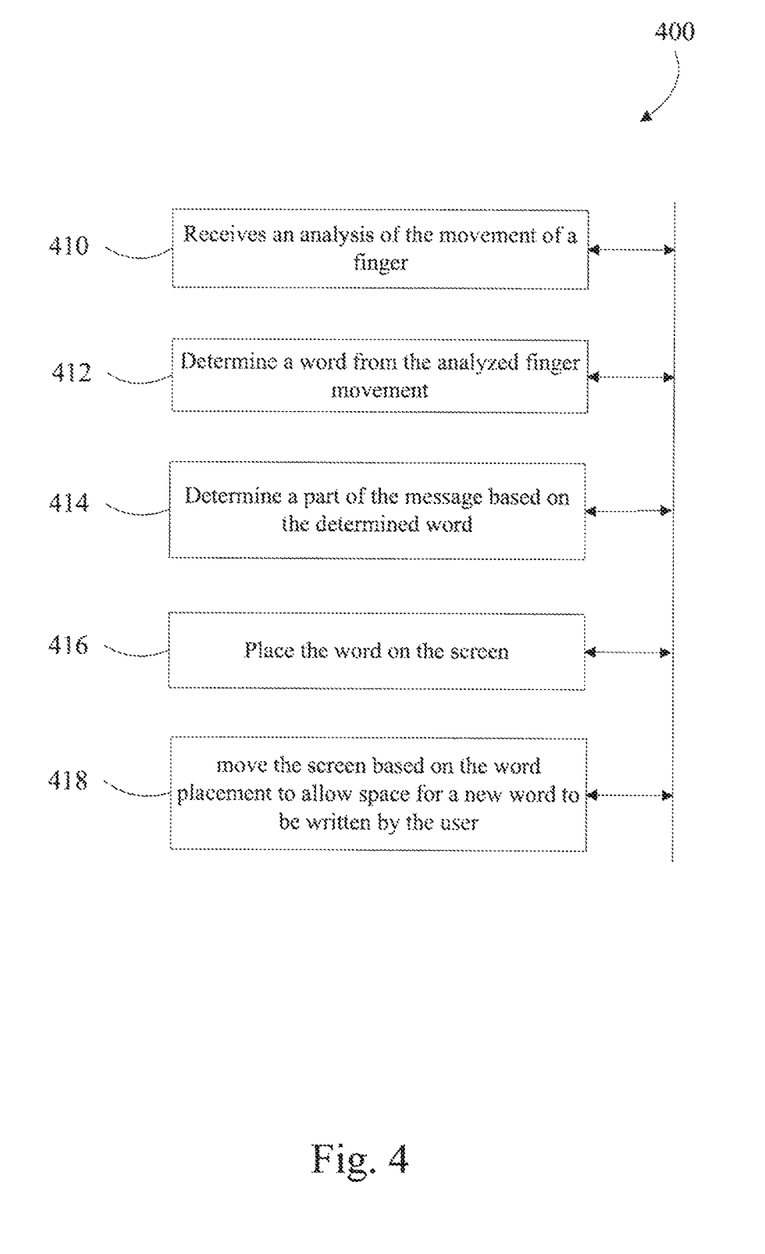
FIG. 4 illustrates a first example method for practicing an embodiment of the disclosure.

FIG. 4 depicts a first example 400 method comprises the following actions receive 410 a mobile device's analysis of finger movement, determine 412 a word from the analyzed finger movement, determine 414 a part of the message based on the determined word, place 416 the word in the message and move 418 the screen based on the analysis to allow space for a new word to be written by the user.

Figure 5:
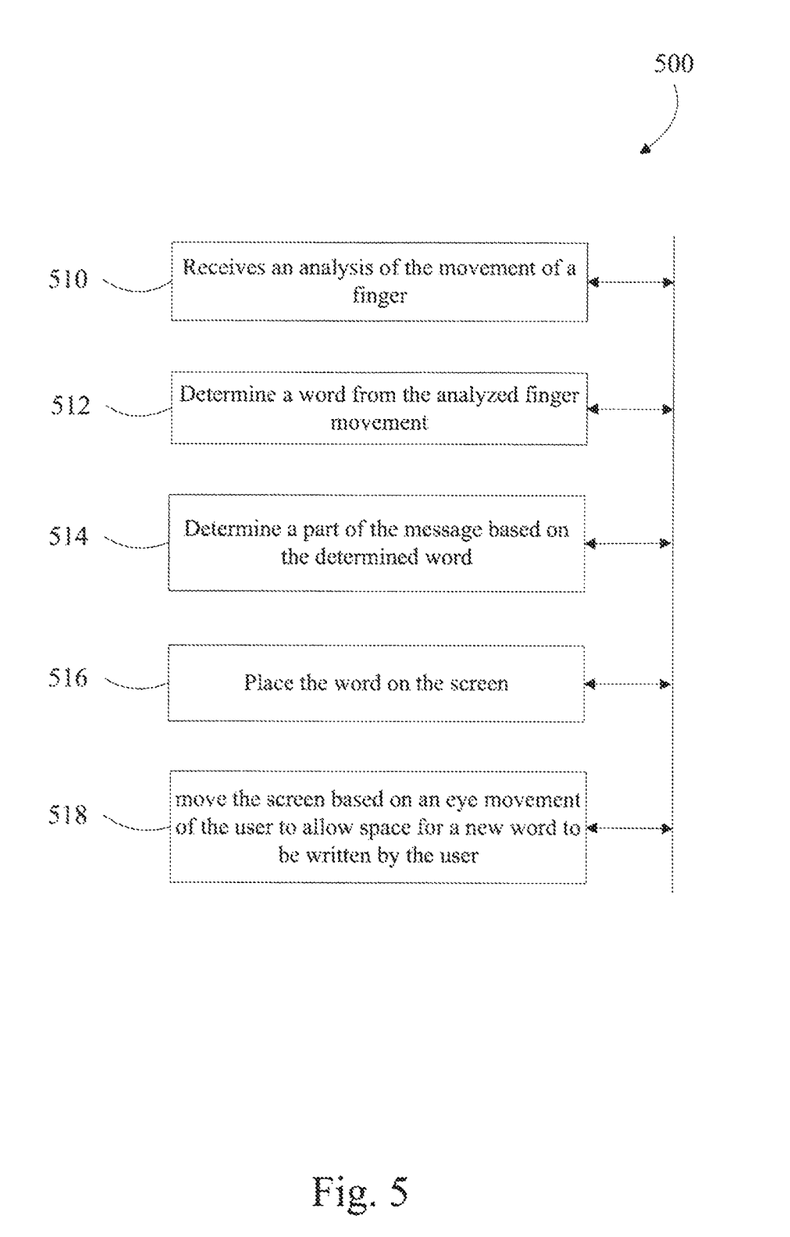
FIG. 5 illustrates a second example method for practicing an embodiment of the disclosure.

FIG. 5 depicts a second example method 500 comprises the following actions receive 510 a mobile device's analysis of finger movement, determine 512 a word from the analyzed finger movement, determine 514 a part of the message based on the determined word, place 516 the word in the message and move 518 the screen based on an eye movement of the user to allow space for a new word to be written by the user.

Figure 6:
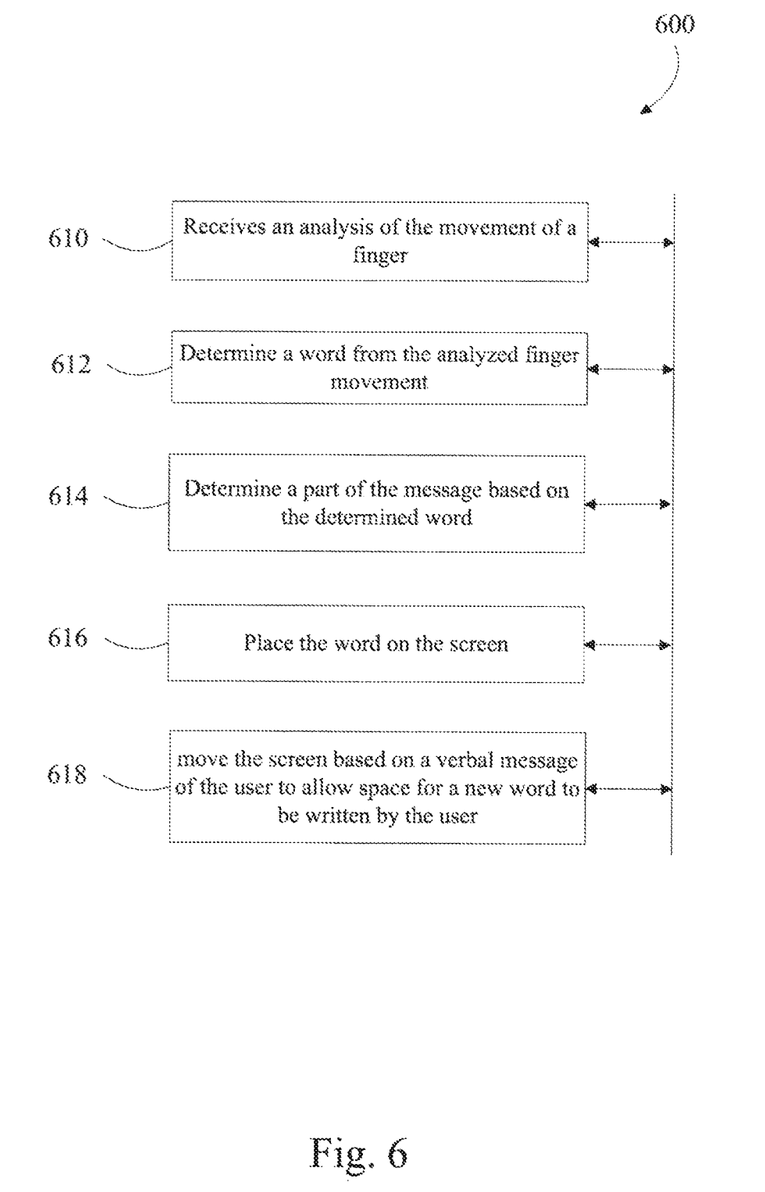
FIG. 6 illustrates a third example method for practicing an embodiment of the disclosure.

FIG. 6 depicts a third example method 600 comprises the following actions receive 610 a mobile device's analysis of finger movement, determine 612 a word from the analyzed finger movement, determine 614 a part of the message based on the determined word, place 616 the word in the message and move 618 the screen based on a verbal message of the user to allow space for a new word to be written by the user.

Figure 7:
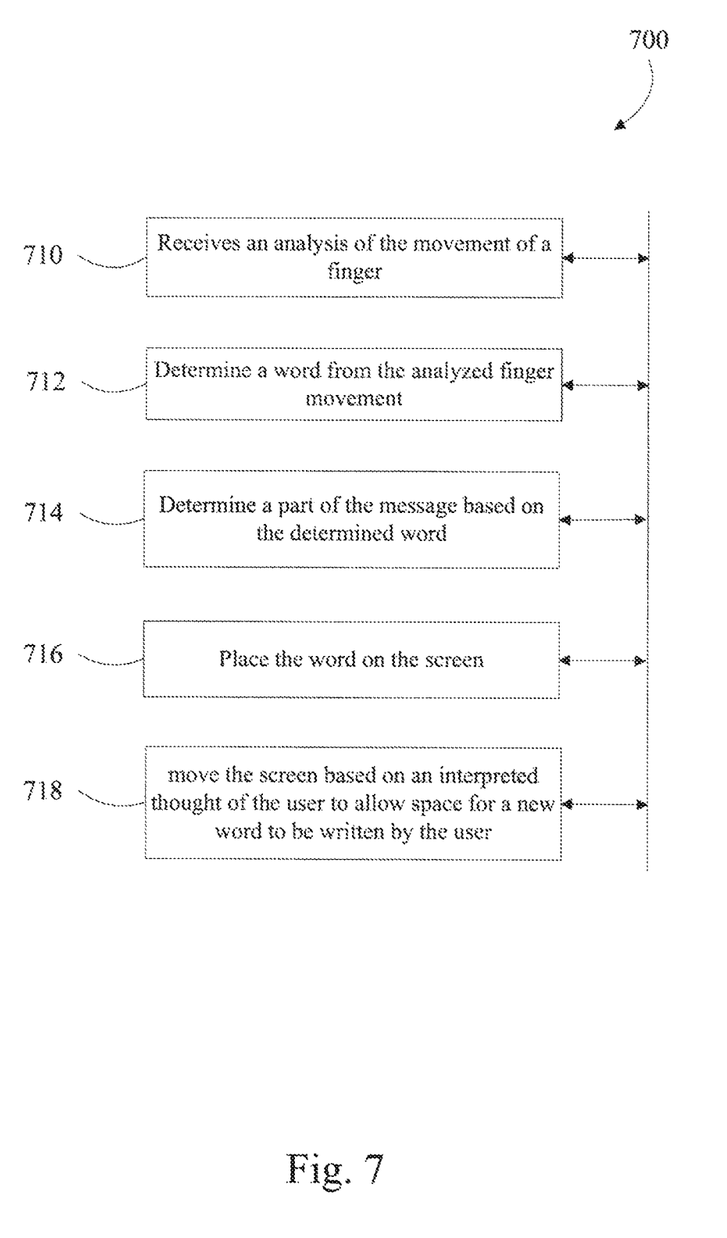
FIG. 7 illustrates a fourth example method for practicing an embodiment of the disclosure.

FIG. 7 depicts a fourth example method 700 comprises the following actions receive 710 a mobile device's analysis of finger movement, determine 712 a word from the analyzed finger movement, determine 714 a part of the message based on the determined word, place 716 the word in the message and move 718 the screen based on an interpreted thought of the user to allow space for a new word to be written by the user.

Figure 8:
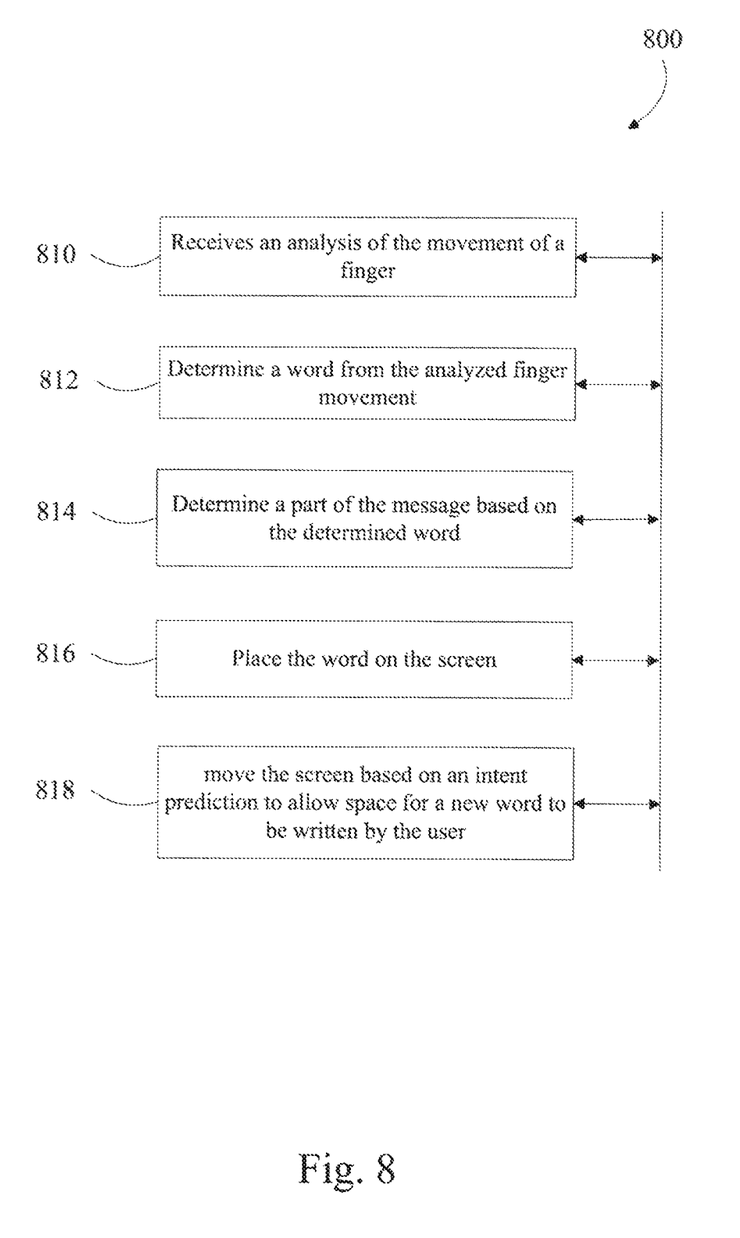
FIG. 8 illustrates a fifth example method for practicing an embodiment of the disclosure.

FIG. 8 depicts a fifth example method 800 comprises the following actions receive 810 a mobile device's analysis of finger movement, determine 812 a word from the analyzed finger movement, determine 814 a part of the message based on the determined word, place 816 the word in the message and move 818 the screen based on an intent prediction to allow space for a new word to be written by the user.

Figure 9:
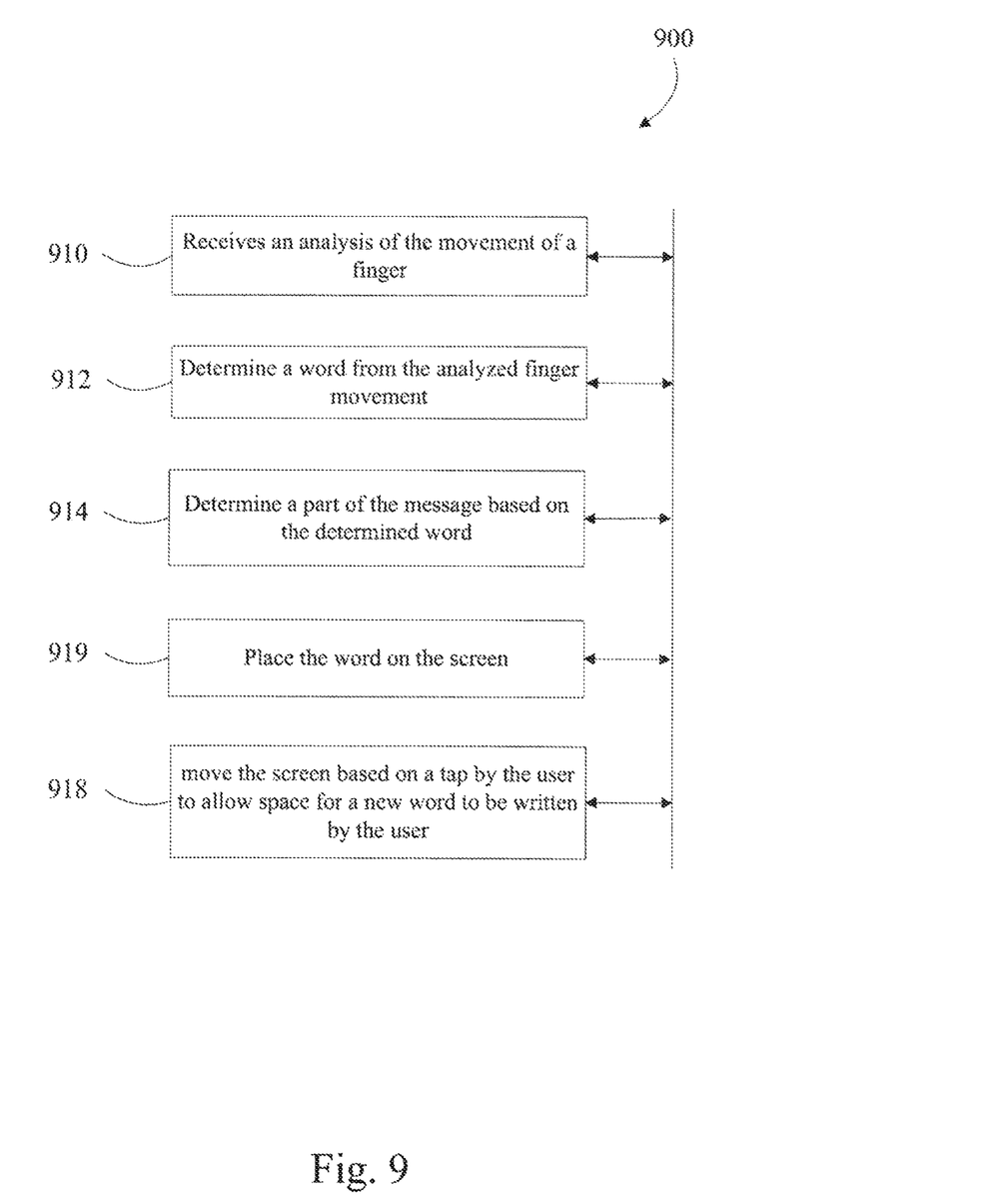
FIG. 9 illustrates a sixth example method for practicing an embodiment of the disclosure.

FIG. 9 depicts a sixth example method 900 comprises the following actions receive 910 a mobile device's analysis of finger movement, determine 912 a word from the analyzed finger movement, determine 914 a part of the message based on the determined word, place 916 the word in the message and move 918 the screen based on the word placement to allow space for a new word to be written by the user.

As the written line is created, the system keeps track of the x and y coordinates of the last drawn point. When the Automove button is touched, a check is performed to determine whether the writing area is zoomed in. If the writing area is not zoomed in, the Automove button moves the writing area down the y axis by the height of the writing screen by a predetermined amount, in this example the writing area divided by fifteen. If this amount would move the user beyond the maximum y location of the work area, the system simply sets the y coordinate to the external edge of the screen, while the x coordinate is not unaffected.

If the writing area is zoomed in, the Automove tool calculates the distance to move in the x and y axes. The system determines whether a last drawn point exists. The y distance is calculated based on a number of guidelines the user currently has activated. In order to determine the amount of height to shift the paper by the y distance is calculated by taking the current y coordinate of the writing area, and adding to it the height of the writing area divided by a predetermined amount, in one example eleven times the zoom scale of the writing area. In another example we divide by twenty-one times: the y distance is calculated by taking the current y coordinate of the writing area, and adding to it the height of the writing area divided by a predetermined amount, in this example twenty-one times the zoom scale of the writing area. The writing area is then set to this new y coordinate and the x coordinate is unaffected.

If a last drawn point exists, and the writing area is not at the maximum x or y coordinate based on the size of the screen. The x distance is calculated by multiplying the x location of the last written point by the zoom scale of the writing area, then subtracting a predetermine amount, in this case fifty times the zoom scale of the writing area minus ten ie. (lastX*zoomSacle)−((50*zoomScale)−10). The x coordinate of the writing area is then set to the x location indicated by this calculation and the y location is unaffected.

If the writing area is currently at the maximum x coordinate and not the maximum y coordinate. The x coordinate is set back to the origin of the writing area. The y distance is calculated based on a predetermined line height set by the user. The user determines their line height by a number of ways. For example, they may select a desired line height for preset options or they may manually set any number of lines they wish to have. If the user does not set a line height then one is automatically set for them and calculated movement as follows: the y distance is calculated by taking the current y coordinate of the writing area, and adding to it the height of the writing area divided by eleven times the zoom scale of the writing area. If the user has specified a line height then, the y distance is calculated by taking the current y coordinate of the writing area, and adding to it the height of the writing area divided by a set number, in this case by twenty-one times the zoom scale of the writing area. The writing area is then set to this new x and y coordinate.

If the writing area is at the maximum y coordinate and not the maximum x coordinate the x distance is calculated by multiplying the x location of the last written point by the zoom scale of the writing area, then subtracting a predetermined amount, in this example fifty times the writing area zoom scale minus ten ie. (lastX*zoomSacle)−((50*zoomScale)−10). The Automove tool then moves the writing area to the x location indicated by this calculation and the y location is unaffected.

If the writing area is at the maximum y coordinate and the maximum x coordinate and the x and y coordinates are unaffected.

Auto move may be used on any surface such as cards, envelopes, photos, letter paper, notebook paper, other writing surfaces and the like.

The operations of a method or algorithm described in connection with the examples disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example a network element, which may represent any of the above-described network components, etc.

Although an exemplary example of at least one of the system, method, and non-transitory computer readable medium of the present disclosure has been illustrated in the accompanied drawings and described in the foregoing detailed description, it will be understood that the application is not limited to the examples disclosed, and is capable of numerous rearrangements, modifications, and substitutions without departing from the spirit or scope of the disclosure as set forth and defined by the following claims. For example, the capabilities of the systems can be performed by one or more of the modules or components described herein or in a distributed architecture.

While preferred examples of the present disclosure have been described, it is to be understood that the examples described are illustrative only and the scope of the disclosure is to be defined solely by the appended claims when considered with a full range of equivalents and modifications (e.g., protocols, hardware devices, software platforms etc.) thereto.

What is claimed is:

1. A method, comprising:
    analyzing a movement of a finger on a writing area of a display of a mobile device;
    determining a hand written word from the analyzed finger movement;
    determining a part of a hand written message based on the hand written word;

placing the hand written word in the hand written message on a paper illustrated on the display of the mobile device;

identifying a last point drawn for the hand written word;

auto moving the paper and the hand written message displayed on the display of the mobile device a calculated distance in an x axis from the last point drawn to provide a new word space on the paper for a new hand written word to be written by the finger when the last point drawn is not at a maximum x coordinate and moving the paper a calculated distance in a y axis from the last point drawn when the last point drawn is at the maximum x coordinate to provide the new word space on the paper for the new hand written word to be written by the finger in the hand written message shown on the paper shown on the display of the mobile device;

inputting a new word in the new word space on the paper shown on the display of the mobile device while the hand written message on the paper shown on the display of the mobile device is stationary;

transmitting the hand written message to a cloud server;

printing by a printer coupled to the cloud server, the hand written message on a card; and printing by a printer coupled to the cloud server, a mailing address for a recipient of the hand written message on an envelope for mailing the card.

2. The method of claim 1 further comprising moving the paper with the hand written message on the display of the mobile device based on the analysis.

3. The method of claim 1 further comprising moving the paper with the hand written message on the display of the mobile device based on an eye movement.

4. The method of claim 1 further comprising moving the paper with the hand written message on the display of the mobile device based on a verbal message.

5. The method of claim 1 further comprising moving the paper with the hand written message on the display of the mobile device based on an interpreted thought.

6. The method of claim 1 further comprising moving the paper with the hand written message on the display of the mobile device based on an intent prediction.

7. The method of claim 1 further comprising moving the paper with the hand written message on the display of the mobile device based on the hand written word placement.

8. A system, comprising:

a processor; and memory;

wherein the processor and memory are communicably coupled to one another;

wherein the processor is configured to: analyze a movement of a finger on a writing area of a paper displayed on a display of a mobile device; determine a hand written word from the analyzed finger movement; determine a part of a message based on the hand written word; place the hand written word in the hand written message on the paper; identify a last point drawn for the hand written word; and based on the analysis, auto moving the paper and the hand written message displayed on the display of the mobile device a calculated distance in an x axis when the last point drawn is not at a maximum x coordinate and auto moving the paper displayed on the display of the mobile device a calculated distance in a y axis from the last point drawn when the last point drawn is at the maximum x coordinate to provide a new word space on the paper for a new hand written word, and receive the new word written by the finger in the new word space on the paper shown on the display of the mobile device while the hand written message on the paper shown on the display of the mobile device is stationary;

a cloud server for receiving the hand written message; and a printer coupled to the cloud server for printing the hand written message on a card and for printing a mailing address for a recipient of the hand written message on an envelope for mailing the card.

9. The system of claim 8 wherein the processor is configured to move the paper with the hand written message on the display of the mobile device based on the analysis.

10. The system of claim 8 wherein the processor is configured to move the paper with the hand written message on the display of the mobile device based on an eye movement.

11. The system of claim 8 wherein the processor is configured to move the paper with the hand written message on the display of the mobile device based on a verbal message.

12. The system of claim 8 wherein the processor is configured to move the paper with the hand written message on the display of the mobile device based on an interpreted thought.

13. The system of claim 8 wherein the processor is configured to move the paper with the hand written message on the display of the mobile device based on an intent prediction.

14. The system of claim 8 wherein the processor is configured to move the paper with the hand written message on the display of the mobile device based on the hand written word placement.

15. A non-transitory computer readable storage medium configured to store instructions that when executed cause a processor to:

analyze a movement of a finger on a writing area of a display of a mobile device;

determine a hand written word from the analyzed finger movement;

determine a part of a hand written message based on the hand written word;

place the hand written word in the hand written message on a paper illustrated on the display of the mobile device;

identifying a last point drawn for the hand written word;

auto moving the paper and the hand written message displayed on the display of the mobile device a calculated distance in an x axis from the last point drawn to provide a new word space on the paper for a new hand written word to be written by the finger when the last point drawn is not at a maximum x coordinate and moving the paper a calculated distance in a y axis from the last point drawn when the last point drawn is at the maximum x coordinate to provide the new word space on the paper for the new hand written word to be written by the finger in the hand written message shown on the paper shown on the display of the mobile device;

inputting a new word in the new word space on the paper shown on the display of the mobile device while the hand written message on the paper shown on the display of the mobile device is stationary;

transmitting the hand written message to a cloud server;

printing by a printer coupled to the cloud server, the hand written message on a card; and printing by a printer coupled to the cloud server, a mailing address for a recipient of the hand written message on an envelope for mailing the card.

16. The non-transitory computer readable storage medium of claim 15, configured to store instructions that when executed cause the processor to move the paper with the hand written message on the display of the mobile device based on at least one of: the analysis; an eye movement; a verbal message; an interpreted thought; an intent prediction; and the hand written word placement.

17. The non-transitory computer readable storage medium of claim 15, configured to store instructions that when executed cause the processor to track x coordinates and y coordinates of a last written point by the finger on the paper shown on the display.

18. The non-transitory computer readable storage medium of claim 15, configured to store instructions that when executed cause the processor to move a writing area on the paper shown on the display down the y axis by a height of the writing area by a predetermined amount, if the writing area is not zoomed in.

19. The non-transitory computer readable storage medium of claim 15, configured to store instructions that when executed cause the processor to calculate a distance to move in the x axis and the y axis, wherein the y distance is calculated by an addition of a current y coordinate of the writing area on the paper shown on the display to a height of the writing area divided by a predetermined amount, if the writing area is zoomed in.

\* \* \* \* \*